(12) United States Patent
Koch

(10) Patent No.: US 9,810,237 B2
(45) Date of Patent: Nov. 7, 2017

(54) EXHAUST-GAS TURBOCHARGER

(71) Applicant: BorgWarner Inc., Auburn Hills, MI (US)

(72) Inventor: Silvio Koch, Kirchheimbolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 514 days.

(21) Appl. No.: 14/373,495

(22) PCT Filed: Jan. 22, 2013

(86) PCT No.: PCT/US2013/022446
§ 371 (c)(1),
(2) Date: Jul. 21, 2014

(87) PCT Pub. No.: WO2013/112424
PCT Pub. Date: Aug. 1, 2013

(65) Prior Publication Data
US 2014/0369820 A1 Dec. 18, 2014

(30) Foreign Application Priority Data
Jan. 26, 2012 (DE) .................. 10 2012 001 570

(51) Int. Cl.
*F04D 29/40* (2006.01)
*F02B 37/00* (2006.01)
*F01D 25/16* (2006.01)
*F01D 25/18* (2006.01)
*F02C 6/12* (2006.01)
(Continued)

(52) U.S. Cl.
CPC ......... *F04D 29/403* (2013.01); *F01D 25/166* (2013.01); *F01D 25/186* (2013.01); *F02B 37/00* (2013.01); *F02C 6/12* (2013.01); *F16C 35/067* (2013.01); *F02B 39/00* (2013.01); *F05D 2220/40* (2013.01); *F05D 2240/53* (2013.01); *F16C 19/184* (2013.01); *F16C 2360/24* (2013.01); *Y02T 10/144* (2013.01); *Y10T 29/49236* (2015.01)

(58) Field of Classification Search
CPC .... F04D 25/04; F04D 25/045; F04D 29/0462; F04D 29/0563; F04D 29/403; F04D 29/60; F04D 29/602; F04D 29/603; F01D 25/166; F01D 25/186; F05D 2220/40; F05D 2240/53; F02B 37/00; F02B 39/00; F02C 6/12; Y10T 29/49236; Y10T 24/45812; F16C 35/02; F16C 2360/24
See application file for complete search history.

(56) References Cited

U.S. PATENT DOCUMENTS

| 5,301,397 A * | 4/1994 | Baum | F16C 1/262 24/594.11 |
|---|---|---|---|
| 2010/0132358 A1* | 6/2010 | Purdey | F01D 25/166 60/605.3 |
| 2012/0045326 A1* | 2/2012 | House | F01D 25/16 415/229 |

* cited by examiner

*Primary Examiner* — Craig Kim
*Assistant Examiner* — Alexander White
(74) *Attorney, Agent, or Firm* — Eric L. Doyle; Stephan A. Pendorf; Patent Central LLC

(57) ABSTRACT

An exhaust-gas turbocharger (1) comprising a compressor (2); a turbine (3); and a bearing housing (4), in which there is arranged a bearing cartridge (5), secured against axial displacement and twisting; and a single fixing element (6) securing the bearing cartridge (5) both against axial displacement and also twisting in the bearing housing (4). Also a method for assembling a bearing cartridge (5) in a bearing housing (4) of an exhaust-gas turbocharger (1).

9 Claims, 3 Drawing Sheets

(51) Int. Cl.
*F16C 35/067* (2006.01)
*F02B 39/00* (2006.01)
*F16C 19/18* (2006.01)

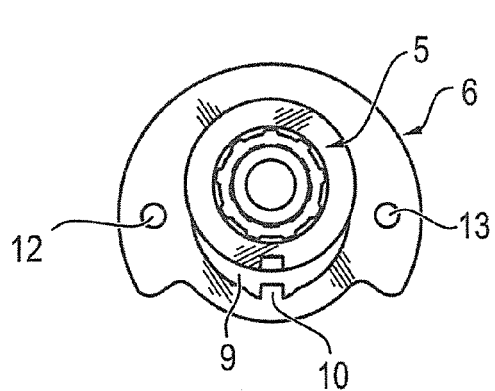
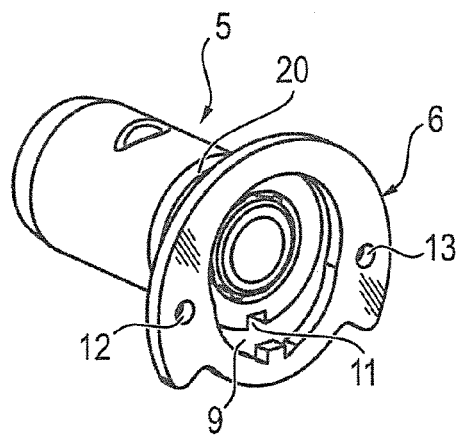
FIG. 4A  FIG. 4B
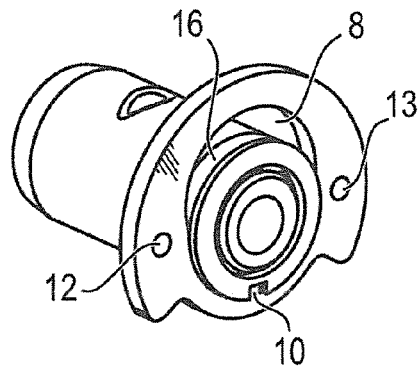
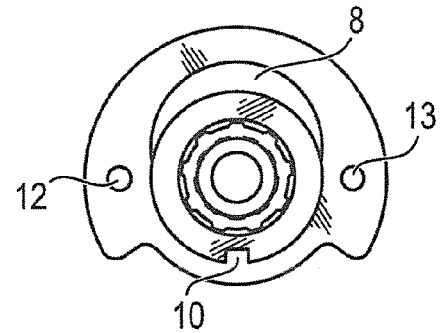
FIG. 4C  FIG. 4D
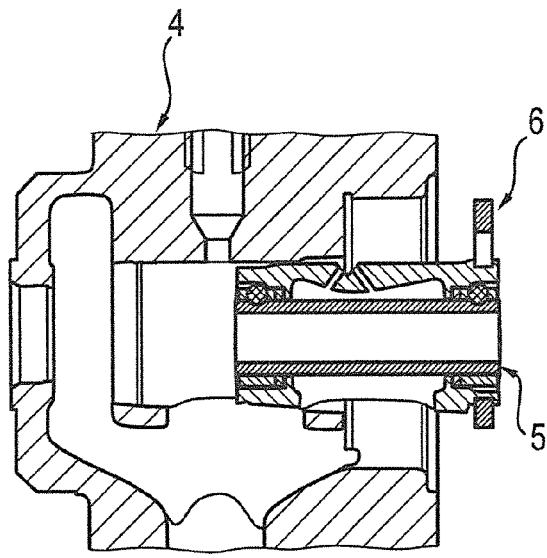
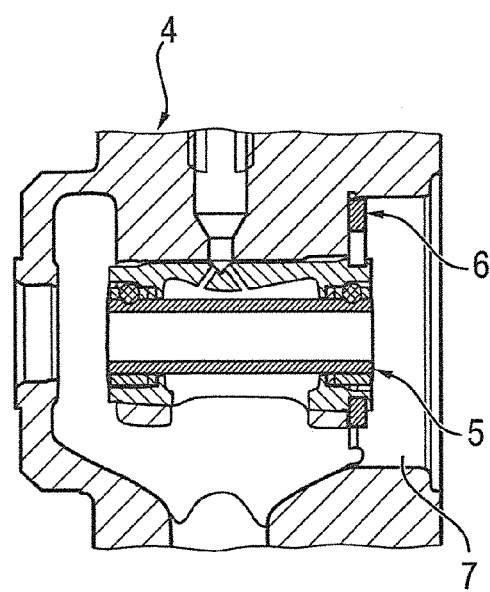
FIG. 4E  FIG. 4F

US 9,810,237 B2

EXHAUST-GAS TURBOCHARGER

BACKGROUND OF THE INVENTION

Field of the Invention

The invention relates to an exhaust-gas turbocharger and also to a method for assembling a bearing cartridge in a bearing housing of an exhaust-gas turbocharger.

Description of the Related Art

For mounting the charger shaft, an exhaust-gas turbocharger of the generic type has a bearing unit, which is also referred to as a bearing cartridge or bearing insert. Cartridges of this type can be used both in plain bearing systems and for systems mounted on rolling bearings.

Fixing elements serve to retain the bearing cartridge in position within the bearing housing, the position retainment against axial displacement of the cartridge and the retainment of the cartridge against twisting in the bearing housing being performed by separate fixing elements arranged, for example, at the ends of the bearing cartridge.

In contrast, it is an object of the present invention to provide an exhaust-gas turbocharger of the type indicated in the preamble of claim 1 and also a method for assembling a bearing cartridge in the bearing housing of such an exhaust-gas turbocharger which make it possible to simplify the assembly and make it more cost-effective.

BRIEF SUMMARY OF THE INVENTION

The fixing element of the exhaust-gas turbocharger according to the invention is formed on the basis of the so-called "keyhole principle", which makes it possible to provide merely a single fixing element in the bearing housing, which secures the bearing cartridge both against axial displacement and also twisting.

In addition to simplified assembly, this leads to a reduction in the number of parts and to the possibility of integrating the positioning in the axial direction and in the circumferential direction.

The dependent claims contain advantageous developments of the invention.

A latching lug is provided in the fixing element and interacts with a corresponding latching recess of the bearing cartridge, and thus forms the anti-twist means between the cartridge and the fixing element.

To secure the fixing element against twisting with respect to the bearing housing, the bearing housing cover is utilized as a pretensioning element. For this purpose, it is possible to provide an external thread on the bearing housing cover and to accordingly pretension the cartridge. Alternatively, it is possible to provide one or more recesses in the fixing element, through which anti-twist screws which are screwed into the bearing housing can be guided. Furthermore, it is possible, instead of the recesses, to form one or more elements on the fixing element, which then engage into one or more recesses provided in the bearing housing, which would result in direct positional assignment and protection against twisting. In this case, too, the bearing housing cover serves as a pretensioning element. Furthermore, the bearing housing cover can be utilized as a positioning aid and anti-twist means. In this respect, it is preferable to provide either screws or stay bolts, which interact with boreholes or threaded boreholes in the bearing housing and in the fixing element.

Finally, it is conceivable to utilize a separate backplate as a positioning aid and anti-twist means. In this respect, too, it is possible for stay bolts or screws to be provided in interaction with boreholes or threaded boreholes in the bearing housing and in the fixing element.

BRIEF DESCRIPTION OF THE SEVERAL VIEWS OF THE DRAWINGS

Further details, advantages and features of the present invention become apparent from the following description of exemplary embodiments with reference to the drawing, in which:

FIGS. 4A to 4F show illustrations of a bearing cartridge and of the fixing element and also of the bearing housing for explaining the sequence of the assembly steps of the assembly method according to the invention.

DETAILED DESCRIPTION OF THE INVENTION

Figure 1:
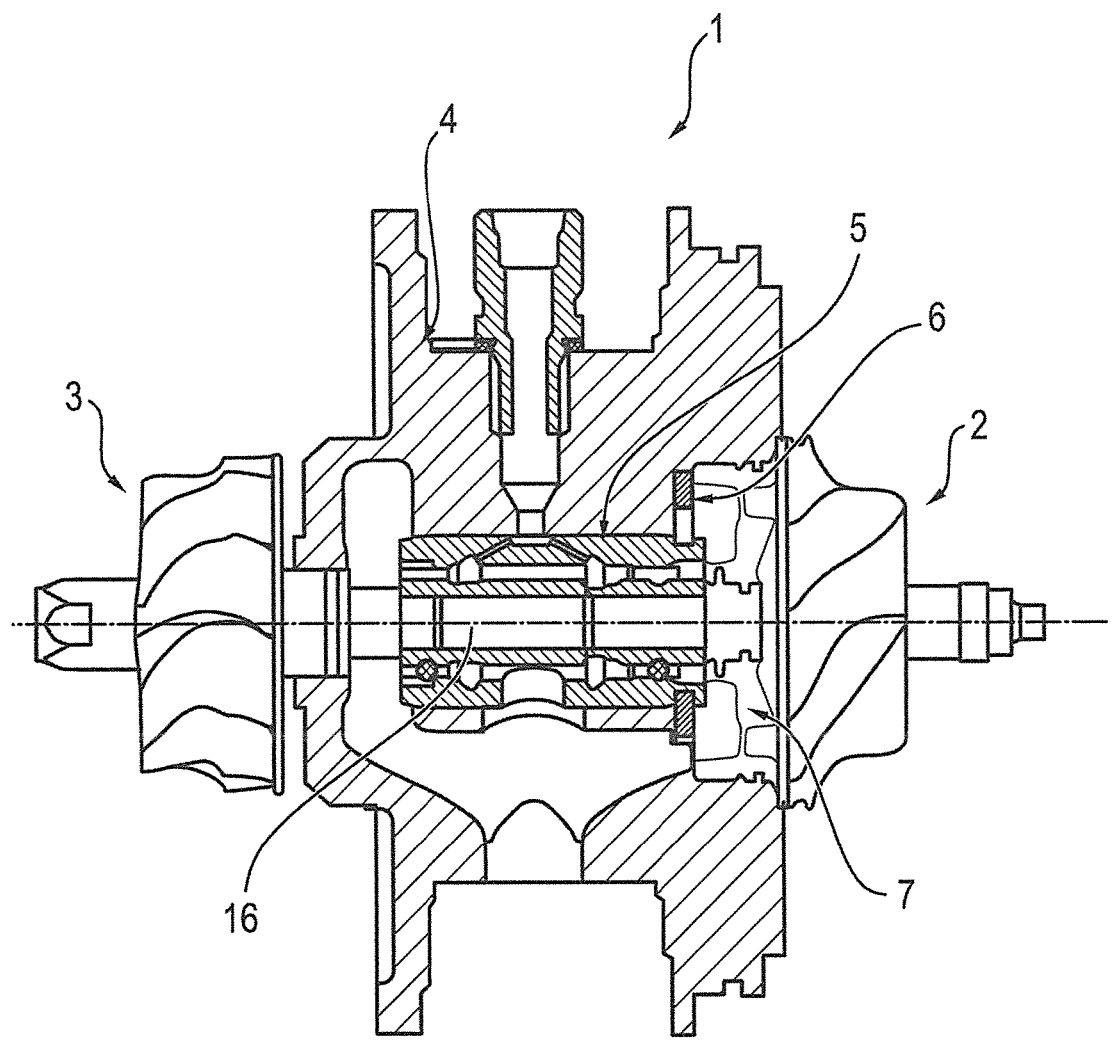
FIG. 1 shows a schematically simplified illustration of an exhaust-gas turbocharger according to the invention.

FIG. 1 shows an exhaust-gas turbocharger 1 according to the invention, which has a turbine 2 and a compressor 3. For simplification of the illustration, neither the compressor housing nor the turbine housing are shown, since these parts are not required for explaining the principles of the present invention.

For mounting a charger or rotor shaft 16, provision is made of a bearing housing 4 between the compressor 2 and the turbine 3, in which bearing housing a bearing cartridge 5 for the rotor shaft 16 is arranged. The bearing cartridge 5 can be formed in this respect both as a plain bearing arrangement and as a rolling bearing arrangement.

Figure 2:
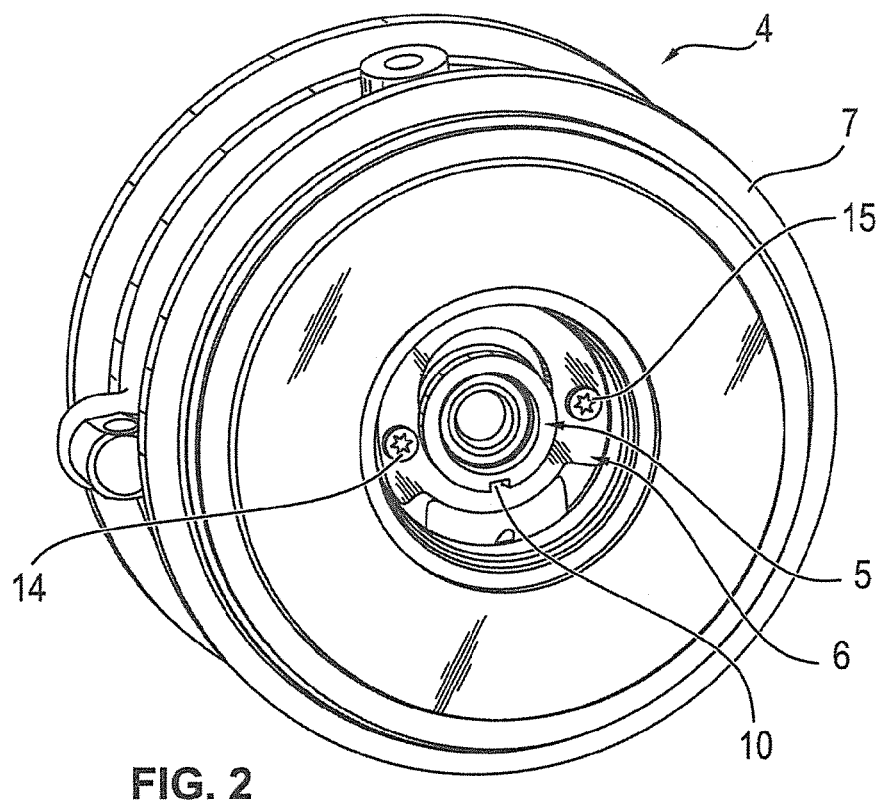
FIG. 2 shows a schematically slightly simplified perspective illustration of a bearing housing of the exhaust-gas turbocharger shown in FIG. 1.

For the combined securing of the bearing cartridge 5 against twisting and also axial displacement in the bearing housing 4, provision is made of a fixing element 6, which in FIG. 2 is shown in the state in which it is assembled in the bearing housing 4. To this end, the fixing element 6 encompasses the bearing cartridge 5 and is secured with respect to the bearing housing 4 by an anti-twist means, which, in the exemplary embodiment illustrated, comprises two anti-twist screws 14 and 15, which are inserted into two associated boreholes 12 and 13 in the fixing element 6, which can be seen in FIG. 3.

Figure 3:
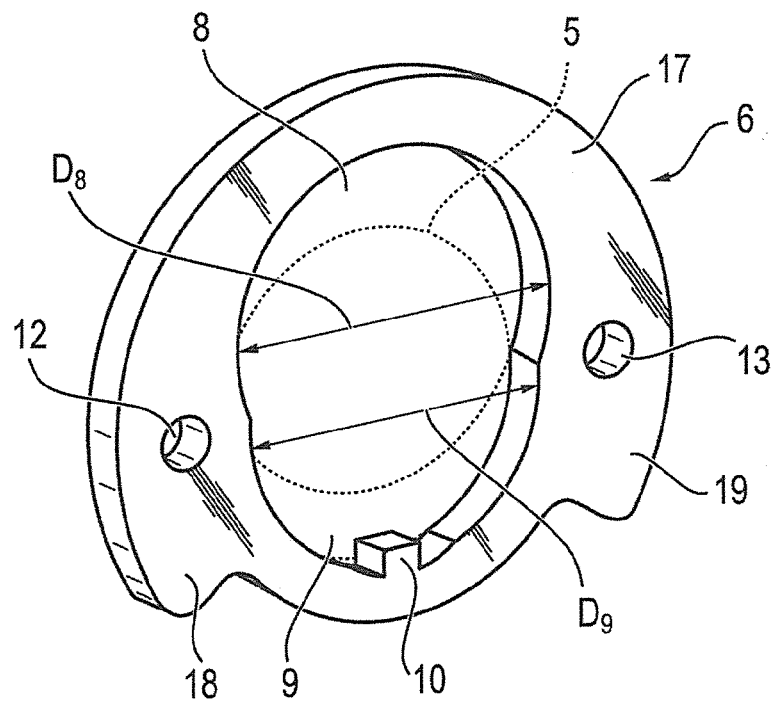
FIG. 3 shows a perspective illustration of a fixing element according to the invention.

For this purpose, the fixing element 6 has an annular main body 17, which is provided on both sides with two widened body portions 18 and 19 in which the boreholes 12 and 13 are arranged, as is apparent in detail in particular from FIG. 3.

An insertion recess 8 with an associated diameter $D_8$ and a holding recess 9 with an associated diameter $D_9$ are also arranged in the body 17. As shown in FIG. 3, the insertion recesses 8 and the holding recesses 9 merge into one another, in order to be able to receive the bearing cartridge symbolized, in FIG. 3, by the dashed circle 5.

FIG. 3 furthermore shows that, as per the illustration chosen in FIG. 3, a latching lug 10 is provided on the bottom of the holding recess 9 and interacts with a latching recess 11, visible in FIG. 4B for example, of the cartridge 5, the interaction arising, for example, from FIG. 2, which shows the assembled state.

FIG. 3 finally shows that the diameter $D_8$ is greater than the diameter $D_9$, which gives the "keyhole principle".

The assembly steps of the method according to the invention further arise from a synopsis of FIGS. 4A to 4F.

After the provision of a bearing cartridge 5 and a fixing element 6, which is formed in the manner described above, firstly the fixing element 6 is pushed with the large insertion recess 8 over the bearing cartridge 5. This arises from the synopsis of FIGS. 4A and 4B.

Then, as per the illustration chosen in FIGS. 4C and 4D, the bearing cartridge 5 is moved downward, so that it engages into the relatively small holding recess 9 with a bottom region of a groove 20, which is not visible in FIGS. 4A to 4C. As the synopsis of FIGS. 4C and 4D, in particular, shows, the latching lug 10 in this case engages into the associated latching recess 11 of the bearing cartridge, and thus secures the bearing cartridge 5 against twisting in relation to the fixing element 6.

The thus preassembled unit consisting of the bearing cartridge 5 and the fixing element 6 is then inserted into the bearing housing 4, as per the illustration in FIG. 4E. To protect against twisting, a screw connection is then made with the screws 14 and 15, visible in FIG. 2, which reach through the recesses 12 and 13 and can be screwed into the bearing housing 4. As an alternative to this, it is possible to provide one or more elements integrated on the fixing element, which then engage into one or more correspondingly formed recesses of the bearing housing 4, but this is not shown as an alternative in the figures.

Finally, the bearing housing cover 7 is fastened to the bearing housing 4, which holds the entire system in position axially in the bearing housing 4.

In addition to the above written disclosure, reference is made, to supplement it, to the illustrative representation of the invention in FIGS. 1 to 4F, in particular with respect to the shaping of the fixing element 6.

List of reference signs

1 Exhaust-gas turbocharger
2 Compressor
3 Turbine
4 Bearing housing
5 Bearing cartridge
6 Fixing element
7 Bearing housing cover
8 Insertion recess
9 Holding recess
10 Latching lug
11 Latching recess
12, 13 Boreholes
14, 15 Anti-twist screws
16 Rotor shaft
17 Body
18, 19 Widened body regions
20 Groove of the cartridge 5
$D_8$ Diameter of the engagement recess 8
$D_9$ Diameter of the holding recess 9

The invention claimed is:

1. An exhaust-gas turbocharger (1) comprising
a compressor (2);
a turbine (3); and
a bearing housing (4),
a bearing cartridge (5), arranged in the bearing housing (4) and secured against axial displacement and twisting via a single fixing element (6), which secures the bearing cartridge (5) both against axial displacement and also twisting in the bearing housing (4),
wherein the fixing element (6) has an insertion recess (8) and a holding recess (9), which merge into one another, the insertion recess (8) having a diameter ($D_8$) which is greater than a diameter ($D_9$) of the holding recess (9), wherein the bearing cartridge has a groove (20) with a bottom region dimensioned for mating engagement with the holding recess (9), wherein a latching lug (10) is arranged in the holding recess (9), and wherein the bearing cartridge (5) has a latching recess (11), wherein the latching lug and the latching recess have corresponding shapes with the latching lug protruding into the holding recess relative to adjacent surfaces of the holding recess, which when the bearing cartridge is seated with groove (20) in the holding recess (9) is dimensioned for being axially and rotationally constrained by the latching lug (10).

2. The exhaust-gas turbocharger as claimed in claim 1, wherein the fixing element (6) has at least one borehole (12, 13) for the passage of at least one anti-twist screw (14, 15).

3. The exhaust-gas turbocharger as claimed in claim 1, wherein the fixing element (6) has one or more elements which interact with one or more associated boreholes in the bearing housing (4) in an assembled state.

4. The exhaust-gas turbocharger as claimed in claim 3, wherein the anti-twist means (14, 15) are anti-twist pins.

5. A method for assembling a bearing cartridge (5) in a bearing housing (4) of an exhaust-gas turbocharger (1), comprising the following method steps:
providing a fixing element (6) having an insertion recess (8) with an insertion diameter ($D_8$) and a holding recess (9) with a holding diameter ($D_9$), the insertion recesses (8) and the holding recesses (9) merging into one another, wherein a latching lug (10) is provided in the holding recess (9),
introducing the bearing cartridge (5) into the insertion recess (8);
inserting a groove (20) of the bearing cartridge (5) into the holding recess (9) of the fixing element (6), while inserting the latching lug (10) of the fixing element (6) into a latching recess (11) of the bearing cartridge (5) to form a preassembled unit wherein the latching lug and the latching recess have corresponding shapes with the latching lug protruding into the holding recess relative to adjacent surfaces of the holding recess;
inserting the preassembled unit made up of the bearing cartridge (5) and the fixing element (6) into the bearing housing (4);
fitting or introducing anti-twist means (14, 15) between the fixing element (6) and the bearing housing (4); and
fastening a bearing housing cover (7) on the bearing housing (4).

6. The method as claimed in claim 5, wherein the anti-twist means used is at least one screw (14, 15), which is screwed into an associated threaded recess in the bearing housing (4).

7. The method as claimed in claim 5, wherein one or more elements of the fixing element (6) are inserted into one or more associated boreholes in the bearing housing (4) as the anti-twist means.

8. The method as claimed in claim 5, wherein the bearing housing cover is utilized as the anti-twist means.

9. The method as claimed in claim 5, wherein the bearing housing cover is utilized as a positioning aid and anti-twist means.

* * * * *